United States Patent [19]
Coleman et al.

[11] 3,982,753
[45] Sept. 28, 1976

[54] COMBINED BACKSTOP AND BRAKE

[75] Inventors: John F. Coleman, Rochester; Donald P. Miller, Webster; John F. Hatzmann, Rochester, all of N.Y.

[73] Assignee: Xerox Corporation, Stamford, Conn.

[22] Filed: Mar. 12, 1973

[21] Appl. No.: 340,155

[52] U.S. Cl. .............................. 271/275; 188/82.7
[51] Int. Cl.² ........................................... B65H 5/02
[58] Field of Search .................. 188/82.7; 192/43.1; 271/275

[56] References Cited
UNITED STATES PATENTS

| | | | |
|---|---|---|---|
| 81,729 | 9/1868 | Baker | 188/82.7 X |
| 3,281,043 | 10/1966 | Plumb | 188/82.7 X |
| 3,339,681 | 9/1967 | Holladay | 188/82.7 X |
| 3,379,432 | 4/1968 | Ruth | 271/51 |

*Primary Examiner*—George E. A. Halvosa

[57] ABSTRACT

A device functioning as a combined backstop and brake for a rotating member. A pivotably mounted spring biased arm rides against a band of resilient material adapted to rotate with the member. The arm thereby frictionally applies a controlled braking force to the rotating member. Reverse rotation of the member causes the arm to depress the resilient material of the band and prevent such reverse motion.

1 Claim, 3 Drawing Figures

U.S. Patent  Sept. 28, 1976  3,982,753
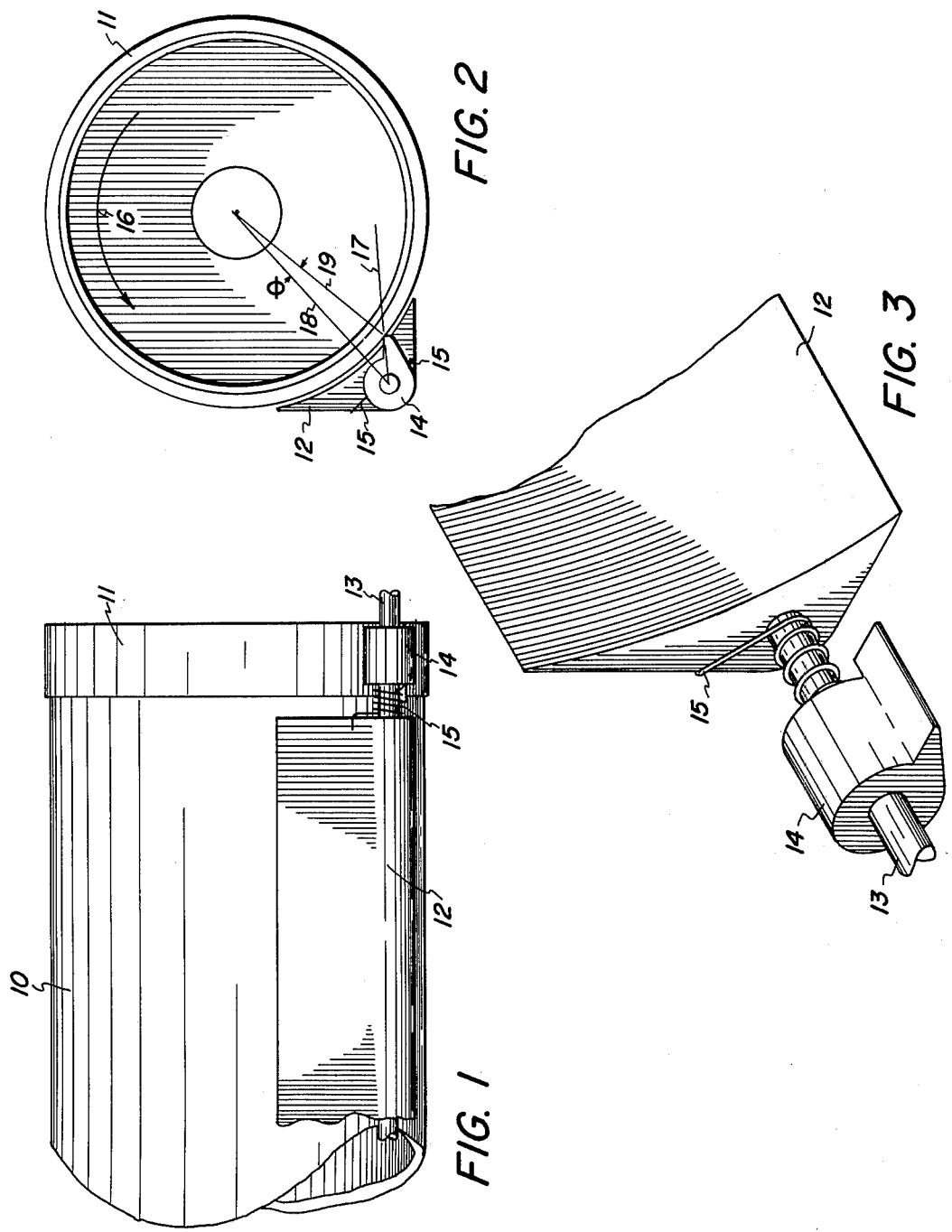

COMBINED BACKSTOP AND BRAKE

BACKGROUND OF THE INVENTION

This invention relates to rotating devices and, more particularly, to apparatus for applying a controlled braking force to such a rotating device while at the same time preventing the device from rotating in a reverse direction.

In the prior art, in order to prevent reverse rotation of a device such as a drum, a pawl and ratchet combination commonly has been utilized. The use of a pawl and ratchet combination has its drawbacks, however. In particular, in a device such as a facsimile transceiver utilizing a rotating drum for document transport, for example the 400 Telecopier transceiver unit manufactured by Xerox Corporation, reverse rotation of the drum therein can cause serious damage to, or destruction of, the stylus used for writing. The use of a pawl and ratchet to prevent reverse rotation still allows enough reverse rotation to damage the stylus. Another problem peculiar to facsimile transceivers is that the pawl and ratchet combination does not prevent jitter in the transmitted copy.

SUMMARY OF THE INVENTION

In accordance with the principles of this invention, apparatus is advantageously provided which acts as both a backstop device to prevent reverse rotation of a drum while at the same time applying a controlled braking force, or drag, on the drum in order to eliminate the jitter problem. This inventive apparatus comprises a pivotably mounted arm which is biased against a circular band of resilient material mounted for rotation with the drum. The arm rubbing against the band creates a drag on the drum and, when the drum is turned backward, the arm depresses the resilient material and prevents rotation in the reverse direction.

DESCRIPTION OF THE DRAWING

The foregoing will become more readily apparent upon reading the following description in conjunction with the drawing in which:

FIG. 1 depicts an elevation view of illustrative apparatus embodying the principles of this invention, FIG. 2 depicts a right side elevation of the apparatus shown in FIG. 1, and FIG. 3 depicts a detailed view of a portion of the apparatus shown in FIGS. 1 and 2.

DESCRIPTION OF THE ILLUSTRATIVE EMBODIMENT

Turning now to the drawing, FIG. 1 illustratively depicts a drum 10 such as that used for conveying sheet material past a scanning station in a facsimile transceiver unit such as the 400 Telecopier transceiver manufactured by Xerox Corporation. Affixed to drum 10 is a circular band 11 of resilient material which functions as a thumbwheel so that the drum may be manually turned by an operator. Fixedly mounted on shaft 13 which is adjacent to drum 10 and parallel to the axis of rotation of drum 10, is wiper 12 whose function it is to ensure that sheet material wrapped around drum 10 is maintained in close proximity to the drum. The relation of wiper 12 to drum 10 may be seen in better detail in FIG. 2 which is a right-side view of the apparatus of FIG. 1.

In accordance with the principles of this invention, pivotably mounted on shaft 13 is a rigid arm 14 which functions as a combined backstop and brake. In order to bias arm 14 into contact with band 11, mounted on shaft 13 is torsion spring 15, the tang at one end of which is placed against wiper 12 and the tang at the other end of which is placed against arm 14. A more detailed view of the mounting of arm 14 and torsion spring 15 on shaft 13 and their relationship to wiper 12 is depicted in FIG. 3. When the drum rotates in the direction shown by arrow 16 (FIG. 2), the frictional contact of arm 14 as urged by torsion spring 15 against resilient band 11 applies a controlled braking force, or drag, to the rotating drum. This allows the drum to rotate smoothly, thereby eliminating any jitter. If an attempt is made to rotate drum 10 in the reverse direction, the tapered end of arm 14 will depress the resilient material of band 11 and prevent any motion in the reverse direction.

Turning now to FIG. 2, arrow 16 depicts the normal direction of rotation of drum 10 with band 11. The direction of thrust of arm 14 is along the line 17 drawn from the pivot point of arm 14 to the point of contact of the tapered end of arm 14 with band 11. In order for the described apparatus to be operative, it is apparent that if a line 18 is drawn from the axis of rotation of drum 10 to the pivot point of arm 14 and another line 19 is drawn from the axis of rotation of drum 10 to the intersection of line 17 with its point of contact with band 11, an acute angle $\theta$ is subtended by these lines 18 and 19 when measured from line 18 to line 19 in the normal direction of rotation of the drum, as specified by arrow 16. It is possible for the described apparatus to still be operative if arm 14 is wrapped around band 11 so that its tapered end contacts band 11 at a point anywhere within 180° of line 18 when measured in the direction of arrow 16. However, if the point of contact is more than 90° away from line 18, the first intersection of line 17 with band 11, as measured from the pivot point, will still be within 90° of line 18, thereby keeping angle $\theta$ an acute angle. It should be further noted that if for some reason arm 14 must be wrapped around band 11 so that the point of contact is further away from line 18 than 180°, when measured in the direction of arrow 16, the biasing mechanism (e.g., spring 15) must have its direction of force reversed. In this last instance, acute angle $\theta$ is measured from line 18 in the direction opposite to arrow 16. The reason for this criticality of angle is that the direction of thrust of the biased arm 14 when the drum is rotated in the reverse direction must be such as to cause the tapered end of arm 14 to depress resilient band 11 and prevent its motion in the reverse direction.

Accordingly, there has been shown a single device which acts as a combined backstop and brake for a rotating device. It will be apparent to those skilled in the art that the present invention may be used generally in cooperation with rotating members and is not limited to the embodiment described. For example, the band of resilient material need not be mounted on the rotating member but may be coupled thereto if the rotating member is not of circular cross-section. Numerous other variations, modifications and adaptations of the present invention will be apparent to those skilled in the art and such as come within the spirit and scope of the appended claims are considered to be embraced by the present invention.

What is claimed is:

1. In a facsimile transceiver including a rotating drum for conveying sheet material past a scanning station, said drum including a thumbwheel of resilient material mounted around said drum at one end thereof, said transceiver further including a wiper mounted on a shaft parallel to the axis of rotation of said drum, said wiper being disposed relative to said drum so as to maintain said sheet material in close proximity to said drum, an improved backstop and brake comprising a tapered arm pivotably mounted on said shaft opposite said thumbwheel, and a torsion spring mounted on said shaft between said wiper and said arm, said spring having a first tang in contact with said wiper and a second tang in contact with said arm so as to pivot said arm into contact with said thumbwheel, said arm being arranged on said shaft and cooperating with said spring so as to apply a braking force on said drum when said drum rotates in a first direction and to depress said resilient thumbwheel when said drum rotates in a second direction to prevent rotation in said second direction.

* * * * *